(No Model.) 5 Sheets—Sheet 1.
F. M. HICKS.
TILE MACHINE.

No. 396,085. Patented Jan. 15, 1889.

Frank M. Hicks,
Inventor

Witnesses
Minnie E. Coyne
Porter B. Coolidge

By his Attorney
Frank D. Thomason (No Model.) 5 Sheets—Sheet 2.

F. M. HICKS.
TILE MACHINE.

No. 396,085. Patented Jan. 15, 1889.

Fig. 2.

Frank M. Hicks
Inventor

Witnesses
Minnie E. Doyne
Porter B. Coolidge

By his Attorney
Frank D. Thomason (No Model.)

F. M. HICKS.
TILE MACHINE.

No. 396,085. Patented Jan. 15, 1889.

Frank M. Hicks
Inventor

Witnesses
Minnie E. Coyne
Porter B. Coolidge

By his Attorney
Frank D. Thomason (No Model.) 5 Sheets—Sheet 4.
F. M. HICKS.
TILE MACHINE.

No. 396,085. Patented Jan. 15, 1889.

Frank M. Hicks
Inventor

Witnesses
Minnie E. Coyne
Porter B. Coolidge

By his Attorney
Frank D. Thomason (No Model.) 5 Sheets—Sheet 5.

F. M. HICKS.
TILE MACHINE.

No. 396,085. Patented Jan. 15, 1889.

Witnesses
Minnie E. Coyne
Porter B. Coolidge

Frank M. Hicks
Inventor

By his Attorney
Frank D. Thomason

UNITED STATES PATENT OFFICE.

FRANK M. HICKS, OF CHICAGO, ILLINOIS.

TILE-MACHINE.

SPECIFICATION forming part of Letters Patent No. 396,085, dated January 15, 1889.

Application filed November 5, 1887. Serial No. 254,400. (No model.)

*To all whom it may concern:*

Be it known that I, FRANK M. HICKS, of Chicago, in the county of Cook and State of Illinois, have invented certain new and useful Improvements in Tile-Machines, of which the following is a full, clear, and exact description thereof, reference being had to the accompanying drawings and letters of reference marked thereon.

The object of my invention is to provide a new and improved tile-machine in which the material can be automatically fed in proper quantities to the mold, in which the tamping-bars may vibrate vertically and at the same time revolve around a common center, in which the mold and core can be stationary, in which a shoulder may be automatically made in flanged tile, and in which the mold containing a tile may be removed from and an empty mold be placed under the tamping-bars concentric with the core automatically, all of which is hereinafter fully described, and is fully illustrated in the drawings, in which—

Reference being had to the drawings, A represents a platform supported at its forward end by an upright and at its rear end by an upright frame, $a$, consisting of two legs, which preferably rest upon a block, $b$, and are connected at their upper ends by a circular band, $a'$.

The platform A is provided with an opening of suitable shape nearer its forward edge, over which a bed-plate, B, is placed having downwardly-projecting flanges adapted to conform to the edges of the opening in platform A, or provided with other suitable means for securing it in position. Bed-plate B is provided with a circular opening, which corresponds in diameter to and through which the core C moves vertically up and down, and it has a flange, $b'$, projecting down from the circular edges of said opening to the plane of the under surface of the platform A, which serves as a guide for said core. I raise or step the upper surface of bed-plate B, surrounding and contiguous to the circular opening therein, a distance from the edges thereof corresponding to the width of the space between the outer circumference of the core and the inner circumference of the mold $c$, which latter rests on said bed-plate, so that its base edges fit snugly around said stepped or raised surface.

The core C is cylindrical in shape, and its top is truncated cone-shaped, and it has running vertically through it a sleeve, $d$, the upper mouth, $d'$, of which is square or oblong in cross-section, and the lower end edges, $d^2$, of which are turned inward and preferably serrated.

Core C is reciprocated vertically by means of a vertical screw-shaft, D, which meshes with a boss, $e$, (tapped to engage therewith,) in the bottom of the core, and is stepped near its upper end to a less diameter, and provided with a head, $e'$, on its upper extremity, of slightly greater diameter, having its periphery serrated. When this core is at the limit of its downward stroke, the screw-shaft will be within sleeve $d$, whereas when said core is moved upward the boss $e$ works off of the screw-threaded part of said shaft into the stepped upper end thereof, and the core ceases to rise and will then be at the limit of its upward movement within the mold. At the same time the core reaches the limit of its upward movement the serrated edges of head $e'$ of the screw D engage the serrations of the lower end, $d^2$, of sleeve $d$ and impart its revolutions thereto.

E represents a standard resting upon and secured to the block to which frame a is secured. It arises from a position thereon between the legs of said frame a and passes vertically upward through the circular band connecting said legs. It has an arm, E', projecting from its upper end toward the front of the machine, over and slightly beyond a vertical line in alignment with the center of screw D. Concentric with said vertical line in said arm E', I provide suitable bearings for the upper end of the tubular vertical shaft F. The heel of this shaft is on the horizontal plane of the top of the core when the same has reached the limit of its upward stroke, and it is provided with an extension, f, which is of such shape that it enters the upper end of the sleeve d, and when the latter revolves has the motion thereof transmitted to it. Secured to the upper surface of the arm E', so that the opening in the bottom thereof will be concentric with the center of shaft F, is a hopper, G. The material of which the tile is to be constructed is fed in a suitable manner to this hopper. From thence it is conveyed through said tubular shaft F to the mold, the sides of said shaft being cut away near its lower end to facilitate the discharge of the material therefrom. In order that this material when it reaches the bottom of said tubular shaft may be shed equally as near as possible on all sides of the core C, I make the heel of said shaft of a casting, F', the base of which conforms to the diameter of the truncated top of said core, upon which it rests, and whose sides converge at angles in alignment with the bevel of the top thereof to a common point within the circumference of said shaft F intersected by its axis.

The material fed through hopper G and shaft F to the mold is very liable, because of its composition, to clog in the latter and cease to flow therethrough unless some means are provided for conveying it downward, and, moreover, such a feed is likely to be very irregular. In most instances I prefer to avoid such difficulties by using a spiral conveyer, g, in said pipe, the shaft of which can be journaled at its upper end in bearings in a cross-frame resting on the upper edges of or made integral with the hopper and having its lower end journaled in the casting F' at the heel of shaft F. On the upper end of the shaft of the conveyer g, above the bearings, is a cone-pulley, h, which is driven by the inverted-cone pulley h' through the medium of a suitable belt. The shaft $h^2$ of the cone-pulley h' is journaled, preferably, in a bracket extending from the front end of arm E', and has the motion of the hollow shaft transmitted to it by suitable gears, i and $h^3$, on said hollow shaft and cone-shaft, respectively. Thus it will be observed that by shifting the belt connecting the cone-pulleys vertically by suitable shifting devices the speed of the conveyer g can be regulated so as to supply material to the mold in suitable quantities, and as said conveyer revolves in an opposite direction to the hollow shaft F it is impossible for such material to clog or choke in said hollow shaft. As the material feeds into the space between the mold and the core, it is necessary that it be packed sufficiently tight therein to preserve it intact when removed from the mold. This I accomplish by tamping-bars H, which heretofore have been used only in conjunction with a revolving mold and core. Instead of revolving the mold and core, I accomplish a saving of considerable actuating mechanism by revolving at a moderate rate of speed the tamping-bars around the axis of the hollow shaft, while at the same time each bar reciprocates. This I accomplish by placing on the said hollow shaft a cam-wheel, I, which has a spline projecting from the inner circumference of the boss of said wheel that enters a vertical groove in shaft F, so that it can move up and down on said shaft, but revolves therewith, and has arranged around its sides several corresponding cam-surfaces, k k, which commence at a common plane, rise gradually a given distance, and then terminate abruptly, so as to precipitate the friction-rollers, which travel up and then down to the base of the next cam-surface, and so on.

The boss of cam-wheel I extends upward a suitable distance and has a circumferential groove therein, within which the boss of the large gear J is journaled. The arms of this gear may be four or eight in number, are preferably arranged equidistant apart, and are provided with the downwardly-projecting hanging frames m m. These latter frames m are adjusted such distance from the axis of said gear that they hang down alongside and a convenient distance beyond the periphery of cam-wheel I, and they are provided at their lower ends with guides m' for the tamping-bars H. These tamping-bars have a transverse arm projecting inward from them at or near their upper ends, on the ends of which are the friction-rollers n n, which roll on the cam-surfaces k, lifting said tamping-bars as the revolving cam-wheel forces them up said surfaces, permitting said bars to drop when they reach and drop from the summit of said surfaces. The gear J is engaged by the vertical gear-shaft K, the teeth of which extend longitudinally from its lower bearing in the bracket L, projecting forward from the standard E almost up to its upper journal in arm E'. It is driven through the medium of a gear, o, on its upper end by gear i on hollow shaft F. As the speed of gear-shaft K is considerably slower than the hollow shaft F, the gear J, carrying the tamping-bars, revolves slowly, while the more rapidly revolving cam-wheel I causes the tamping-bars to reciprocate. As the weights of the tamping-bars cannot always be depended upon to cause said bars to drop quickly or regularly, I prefer to place a contraction-spring, P, on said bar immediately under the uppermost guide m' on the hanging frame m, which presses down upon a suitable collar secured to the tamping-bar, as shown. This spring P forces the tamping-bars down quickly. In order to avoid any undershock to the said bars or their actuating mechanism, I place upon the lower guide m' a rubber washer of sufficient thickness that it deadens the blow the collar on the bar would otherwise make against said guide.

Figures 1, 9, 10:
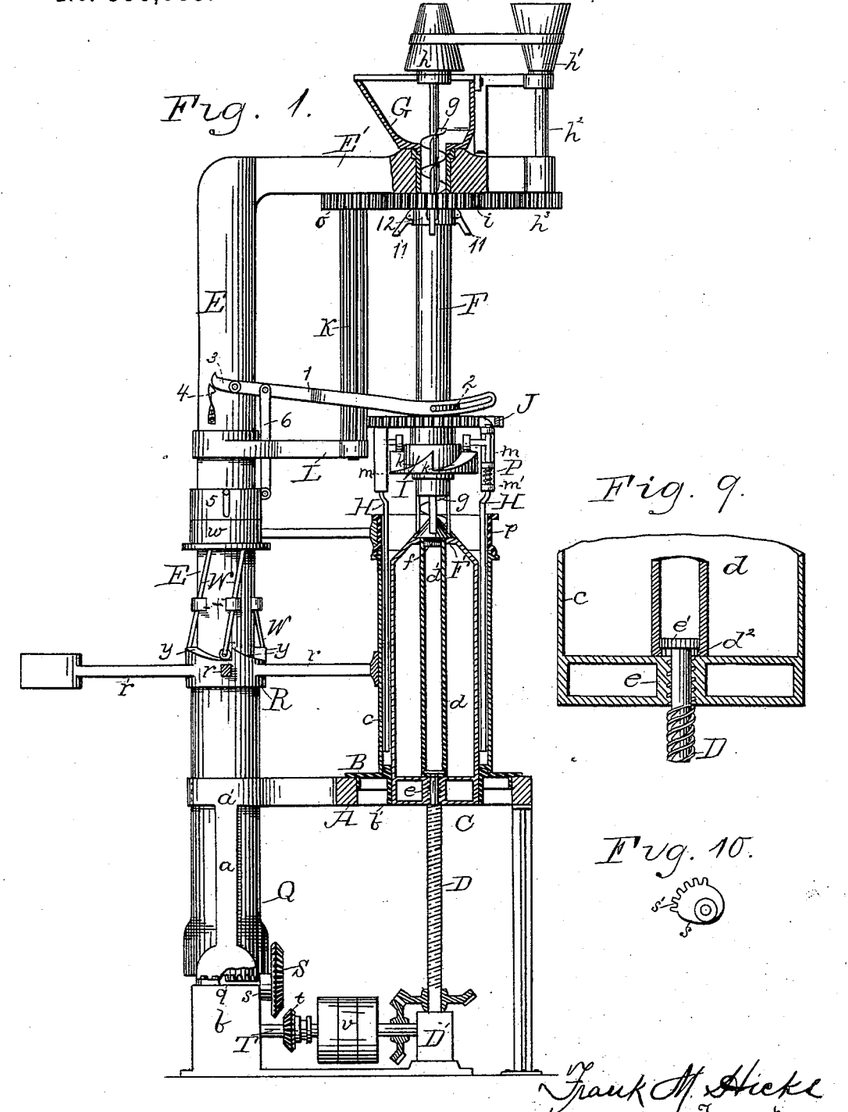
Figure 1 is a side elevation of my invention, showing the core and hoppers in cross-section.
Fig. 9 is a detail view showing the lower end of the core in cross-section.
Fig. 10 is a detail view showing a cam.
Figure 2:
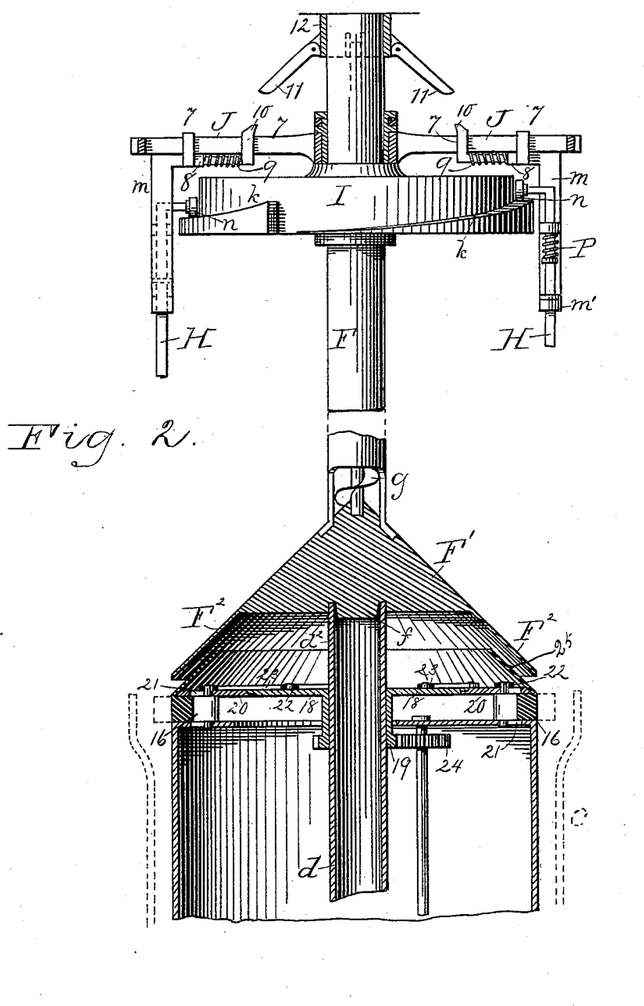
Fig. 2 is a side elevation of the tamping-bar-actuating mechanism and the upper part of the core, the latter in cross-section, so as to show devices for automatically making the shoulders of flanged pipe.

The operation of the mechanism described thus far is substantially as follows: The core is moved vertically up into the mold, where, when it reaches the limit of its upward stroke, it, through the medium of the sleeve d, causes the motion of screw-shaft D to be transmitted to the hollow shaft F. The revolution of the hollow shaft sets the tampers reciprocating and at the same time slowly revolving around the axis of said shaft, and also causes the conveyer g in said hollow shaft to revolve and supply from hopper G the necessary material between the mold and core. As the tile is built, the action of the tamping-bars forces the gear-wheel J upward, carrying said bars and the cam-wheel I operating them up and down. When the tile is complete, the operator reverses the motion of the screw-shaft, which draws the core down, thus disconnecting the motive power of the said screw from the hollow shaft and causing the tamping-bar mechanism and the feed mechanism to cease operating. When the core has reached the limit of its downward movement, it is necessary to remove the mold c, with the freshly-made tile therein, before the construction of another tile can be commenced, and to do this the hopper p, which rests upon the edges of the mold, must be lifted therefrom. The removal of the mold has heretofore been done by hand, as likewise in many instance has the lifting of the hopper p. This can also be done in my machine; but I prefer, in view of the loss of time and the labor involved to accomplish the removal of the filled mold, the lifting of hopper p, the substitution of the empty mold on the bed-plate, and the lowering of the said hopper, to have such work accomplished automatically. To this end I place on the lower end of standard E a sleeve, Q, which extends from the block b, upon which the standard rests, up to about the plane of the center of the mold, where its upper end is surrounded by a collar or boss, R, from which four arms, r r, radiate at equal distances apart and to a distance from said boss corresponding to the distance therefrom in a straight line to the nearest point of the mold c, where they are bifurcated, each of said bifurcations being adapted to surround and conform to the circumference of the mold until they reach a point intersected by a transverse line drawn through its center, beyond which they project but a short distance. The molds may, if desired, be provided with lugs or a circumferential ridge just above the plane of the upper surface of edge of arms r r, so that when said sleeve is raised vertically (as by means to be now explained) the mold is lifted off of said bed-plate. In order to give said sleeve its vertical movement, I journal in block b a shaft, which has just in front of its bearings a cam, s, of the shape shown in Fig. 10, and a bevel-gear, S, just in front of it on the end of said shaft. This cam has, as will be observed, a series of cogs, s', occupying one-quarter of its engaging-surface at its greatest radius, and it is so located upon its shaft that the edges of the sleeve Q rest upon it. As it revolves, the cam s gradually pushes sleeve Q upward a distance corresponding to the difference between its major and the minor radius, and when said sleeve has been pushed up this distance the cogs s' engage a series of cogs, q, on the bottom edge of said sleeve and turn it on its axis about one-quarter of a revolution. Thus the arm r, holding the mold containing the freshly-made tile, will not only be lifted up off the bed-plate, but is moved laterally from under the tamping-bars one-quarter of a revolution, just sufficient to oscillate the next arm r under the tamping-bars concentric with the axis of shaft F, and there deposit an empty mold upon the bed-plate. To accomplish this depositing or lowering of the mold in proper place upon said bed-plate, the cam s has got to be so shaped that when the series of cogs s' cease to engage the cogs q of the sleeve the latter will be gradually lowered until its plane edges rest upon the minor radius of said cam. The gear S is engaged by a beveled pinion, t, placed upon the drive-shaft T, which can be shifted upon said shaft either automatically or at the will of the operator, so as to disengage from said gear S when it has completed its revolution. The drive-shaft T is journaled in block b at its rear end and in the bearing-block D', in which the heel of the screw-shaft D is journaled at its front end, which latter it drives through the medium of the bevel or miter gears shown. This drive-shaft has a nest of three pulleys r, arranged on it side by side, the middle one fast and the other two loose. By engaging said pulleys with an open and a crossed belt from the main shaft said drive-shaft can, by shifting onto the fast pulley first the open and then the crossed belt, be reversed first in one direction and then in the other. This shifting can be done automatically by devices which will operate when the tamping-bars have reached the limit of their upward movement, or, as I prefer at present, by hand. It is necessary to raise the hopper p a little higher than the mold when the latter is to be removed, and said hopper must be controlled so that when the next empty mold is placed upon the bed-plate the hopper will settle down upon it, as shown in the drawings. This can be accomplished by surrounding the standard E at a point about on the same horizontal plane as the hopper with a short sleeve, w, which has an arm projecting in a straight line to said hopper, having its end bifurcated and surrounding and holding the hopper in the same manner identically as arms *r* of boss R support and carry the molds. This sleeve, is supported by the rods W, which come under the flanged lower edges of the said sleeve, and have their lower ends either resting directly upon the upper edges of boss R or provided with casters which rest upon said edges, and which are limited to a vertical reciprocating motion, or a motion slightly oblique to the vertical sides of said standard, by passing through the guides *x x*, secured to and projecting from said standard, as shown. When the sleeve Q rises through the medium of rods W, the sleeve *w* is pushed upward a corresponding distance. In order, however, to lift the hopper yet higher, so as to clear the upper edges of the mold, I provide the upper edges of said boss R with a series of four corresponding inclined planes or cam-surfaces, *y*, the one commencing about where the next preceding one ceases. Thus when the sleeve reaches the limit of its upward motion and revolves one quarter of a revolution, as hereinbefore described, the cam-surfaces push the rods still higher until they reach the top of the incline. When the lower ends of these rods have reached the summit of said inclines, the arm *r* carrying the empty mold will have been oscillated under the arm carrying the hopper, and parallel thereto, so that as said rods drop or descend from the summit of the inclines *y* the hopper settles down over and onto the upper edges of the mold, and both are lowered concentric to the center of the core down upon the bed-plate.

It has been described how that the action of the tamping-bars lifts the "tamping-bar carriage" (by which term the cam-wheel I and the tamping-bar carrying gear J are both included) up as the tile is built. It will be readily understood that some arrangement of devices must be adopted for maintaining said carriage in its elevated position while the mold containing the recently-made tile is being removed and an empty mold is replacing it. In the event automatic devices for removing the mold and lifting the hopper are not used I pivot to the sides of the standard a lever, 1, which preferably has its front end divided into two arms, which pass along either side of the upwardly-extending boss of cam-wheel I, where, above the plane of the boss of gear J, (journaled therein,) there is an annulus, 2, set into a suitable groove in said boss, which has laterally-projecting studs, which pass through the slotted ends of the arms of lever 1. This lever is oscillated upward as the tamping-bar carriage moves upward until the latter reaches the limit of its upward movement, whereupon the rear extension, 3, of said lever (which is suitably shaped for the purpose) is caught by the spring-actuated snap-hook 4 and held until the mold and hopper are placed in position and the operator releases it. Should the mold be removed and the hopper lifted automatically, as hereinbefore described, the extension 3 and hook 4 are dispensed with, and instead I provide a ring, 5, around the standard E, which, when the tamping-bar carriage is down, rests upon the upper edges of the sleeve *w*, and provide it with lugs projecting forward from it, between or to which is pivoted the lower end of the link 6, which connects said ring and has its upper end pivoted to the lever 1 a suitable distance in front of the fulcrum thereof.

As the lever is oscillated upward, it, by means of link 6, pulls ring 5 up after it and away from sleeve *w*. The latter, however, through the action of sleeve Q, rises until their two edges meet again. When said sleeve *w* is pushed yet higher by reason of the inclines *y* of the boss R, it pushes said ring 5, link 6, lever 1, and tamping-bar carriage upward also. As, however, the sleeve *w* moves downward, (after the mold has been placed in position and the hopper dropped thereon, as hereinbefore explained,) the said carriage is lowered thereby.

Figure 3:
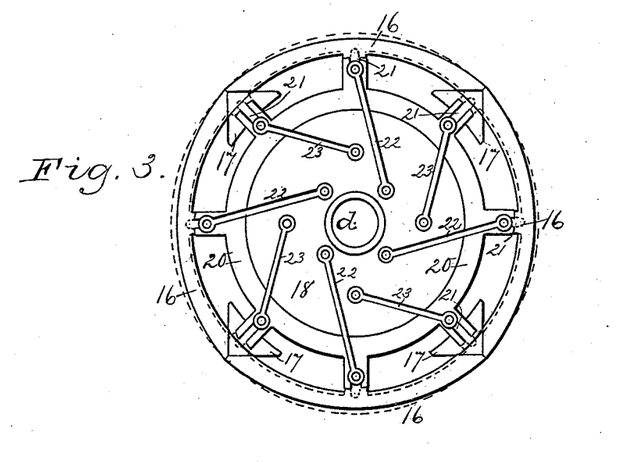
Figs. 3 and 4 show horizontal cross-sections of the upper end of the core, as shown in Fig. 2.

The constructions of the mold, core, and devices for operating the tamping-bars, as heretofore explained, are confined to the manufacture of straight tile. To make sewer-tile—that is, pipe which is flanged or increases in diameter at one end—other means than those described must be used. It is necessary the upper end of the mold should be flared outward, or, in other words, increased in diameter, as shown in Fig. 3. There must be mechanism for automatically pushing the tamping-bars radially outward from the axis of pipe F when the lower ends thereof arrive (in their upward course) at the point where the mold begins to flare outward, and there should be devices for cutting the circumferential shoulder or seat in the upper end of the freshly-made tile.

To automatically spread the tamping-bars, I construct the hanging frames *m* of an inverted-L shape, and provide the horizontal part with straps 7 7 near its end and the vertex of said hanger *m*, which surrounds the arm of gear J, from which it depends, and permits its moving longitudinally thereon a suitable distance. To regulate the distance the horizontal part of hanger *m* can move, so as to carry the tamping-bars (which are secured to the vertical part of the hangers, substantially as heretofore explained) radially outward sufficiently to pack the material in the flared upper end of the mold, I place around said horizontal part between the strap 7 of the end thereof and a guide, 8, (extending down from the gear-arm and against which the outer strap bears when the tamping-bars are packing the body of the tile,) a coil-spring, 9. Thus when the bars are automatically pushed outward the spring 9 is compressed just sufficient to permit the tamping-bars to pack the flange of the tile, and when devices for spreading said bars release or disengage said hangers they assume, by reason of the expansion of the said spring, their normal positions, as shown in the drawings. The straps 7 on the inner end of the horizontal arm of said hangers have lugs 10 arising from them, which are when they reach the point in the upward movement of the tamping-bar carriage at which the tamping-bars are to construct the flange of the tile anticipated by the downwardly-inclined spreading-bars 11. These spreading-bars are pivoted between lugs projecting from a collar, 12, secured to shaft F, immediately under the gear $i$ thereof, and have their pivoted ends constructed, as shown, so that they can oscillate downward to but a certain angle, but are free to oscillate upward as far as need be. The distance between the vertical plane of the free ends of said spreading-bars when at rest and the vertical plane thereof when said bars are in a horizontal position corresponds to the distance the hanging frames $m$ must move outward in order that the tamping-bars may pack the flanged end of the tile. The friction-rollers $n$ $n$ continue to operate just as before; but the cam-surfaces of the cam-wheel are about twice the width they would be when used in conjunction with non-spreading tamping-bars.

The coring or making of the shoulder in the upper end of the tile may be done by the use of a suitable tool in the hands of the attendant; but I prefer something automatic, the action of which will always be the same and positive in its nature. To this end I have lying flat upon the conical sides of the top of casting F' when not in use a knife, 13, the blade of which has a square or suitably-shaped cutting-edge, and which is connected at an angle to its stock corresponding to the angle the vertical sides of the core are to the incline of the sides of said casting. The stock of this knife is cylindrical and is journaled in the eyes or staples secured to the sides of said casting F'. This stock is provided with a laterally-projecting lug, 14, which, when knife 13 is pushed down the inclined sides of the casting and oscillated to a vertical position, prevents continued oscillation by striking against the casting. When the knife is oscillated so as to be pushed back upon said casting, said lug will be at right angles to the sides thereof, and the stock of said knife will be clamped by the action of a spring, 15, which is secured longitudinally under its upper end to the side of the casting and is curved outward, so as to press the adjacent end of said stock between it and its bearings.

Figure 4:
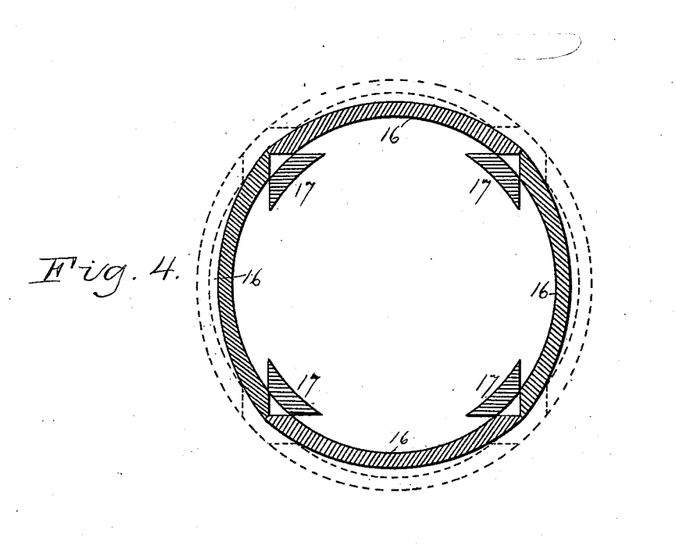

The knife just described is simple and perfectly practical in its construction and operation; but, in view of the fact that its location would impede the even distribution of feed to a certain extent of the material from the hollow shaft F to the mold, I have invented the following devices to accomplish the same result, to wit:

The upper end of the core terminates with its top partially closed, a central opening being left therein for the sleeve $d$ to extend upward beyond the same, so as to couple with the extension of lug $f$ of the casting F', the sides of which extend downward from the body of the casting so as to form an apron, $F^2$, which overhangs and protects the top of said core from the material shed therefrom, and whose edges are removed a suitable distance above the same, as shown in the drawings. Resting upon the top of the core, adjacent to the circumferential edges thereof, are four forming-blocks, 16 16 16 16, the outer surfaces conforming to a segment of the inner circumference of the flange of the tile they are to make, whose ends abut against the adjacent block, and which, when operated, move outward in a direction in alignment with an imaginary line drawn through their centers of length and the axis of sleeve $d$. They move outward a distance from the cylindrical sides of the core corresponding to the difference between the inner circumference of the body of the tile and that of its flanged end, and of course as they move outward simultaneously separate from one another, so as to leave a space between their adjacent ends, as shown in Fig. 4. To fill these spaces thus made I have the four miter-blocks 17, which move in a straight line, intersecting the axis of the sleeve $d$ and the center of the spaces thus made, and which are of such shape that they exactly fit said spaces and make, in conjunction with blocks 16 when moved outward their full limit, a circular flange which spreads outward from the top of the core at the proper moment to form the shoulder in the flanged end of said tile. The miter-blocks 17 have to move just twice the distance blocks 16 do, and in order to reach the limit of their outward movements at the same time blocks 17 move just twice as fast as blocks 16. In order to operate these blocks simultaneously and as described, I surround the sleeve $d$ with a circular plate, 18, about on the plane of the upper surface of the blocks 16 and 17, which has a sleeve projecting down from the circular edges of its central opening, which has a series of cogs, 19, surrounding its lower edges. The outer circumference of plate 18 rests upon the rabbeted edges of the opening of the annulus 20, which is suitably connected with and supported above the top of the core, as shown. The outer circumference of this annulus is such that it projects out nearly to the edges of said blocks 16 and 17 when in their normal positions, and they are provided with radial slots 21 in alignment with the line of motion of said blocks and just to the rear of same. These slots correspond in length to the extent of movement of said blocks, and have projecting up through them from said blocks suitable studs, by which they are connected to the circular plates 18 by the links 22 and 23. The links 23 are shorter than 22, and are pivoted at their inner ends farther from the center of said plate than links 22 and at their outer ends to the studs rising from blocks 17. The outer ends of links 22 are connected to blocks 16 and their inner ends to said circular plate at such a distance from the center thereof that when said plate is oscillated they force blocks 16 out to the limit of their movement one-half as rapidly as links 23 force blocks 17 and only one-half the distance.

The circular plate may be oscillated around the axis of sleeve $d$ by means of a pinion, 24, on the end of a vertical shaft, which engages the series of cogs 19 on the lower end of the sleeve depending centrally from said circular plate.

The edges of the apron F² of the casting F' could, if desired, extend down to and touch the upper surface of the blocks 16 and 17; or I can provide the feeders 25, which consist of strips of sheet metal extending at a corresponding angle up under the apron F² from the upper outer edges of blocks 16 and 17, which, when said blocks were at the limit of their outer movement, would form a continuous shed for the material fed to the mold from the outer edges of said apron to the edges of said blocks. I do not wish to be confined to the use of these feeders, however, nor to the use of the mechanism described for oscillating the circular plate—that is, when using this particular method of flanging tile—because they can either be dispensed with or other devices used in lieu thereof.

Figure 5:
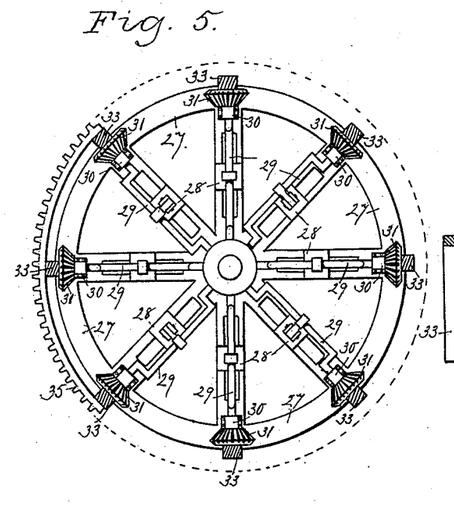
Figs. 5 and 6 show plan and vertical transverse sections, respectively, of modified actuating devices for the tamping-bars.
Figure 6:
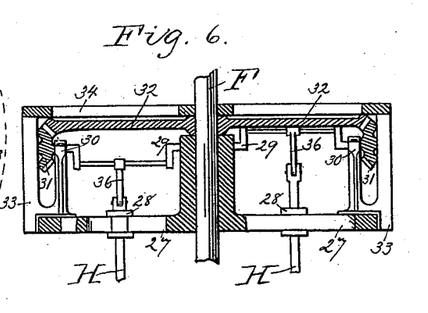

In Figs. 5 and 6 are shown modified devices for reciprocating vertically and for revolving transversely the tamping-bars. They consist, as shown in said figures, of a wheel-shaped frame, 27, the arms of which have vertical guides 28, capable of longitudinal adjustment on them. Arranged parallel above these radial arms of frame 27 are a series of radial shafts, 29, having their inner ends journaled in the boss of frame 27, which extends upward far enough for this purpose, and having their outer ends journaled in and extending through suitable bearings, 30, secured and arising from the rim of said wheel-frame. Between the bearings of each of these radial shafts they are provided with double cranks, as shown, and on their outer extremities they are provided with corresponding beveled pinions, 31, which are engaged and driven by the large bevel-gear 32, which is mounted on and revolves with the shaft F on which the said wheel-frame is loosely journaled. The said wheel-frame is preferably connected by vertical bars 33 with a circular-shaped frame, 34, concentric with and surrounding shaft F, which is located on a plane above the bevel-gear 32. Surrounding said vertical bars and secured thereto is an annulus, 35, which is provided with a series of cogs that are engaged by the gear-shaft K. Thus the shafts 29 are revolved by gear 32, while the frame in which they are journaled is revolved slowly. Pivoted on and depending down from the cranks of shafts 29 are pitmen 36, which are pivotally connected to the upper ends of the tamping-bars H. These devices may be used in conjunction with a hollow or solid shaft, F, and may be capable of a vertical movement thereon or not, as desired. They are more especially adapted to the making of tile of a large diameter, although, as is obvious, they could be used for making the smaller sizes thereof. Should the core and mold revolve, the frame 27 would not be engaged by shaft K, but would be prevented from revolving in some suitable manner.

Figure 7:
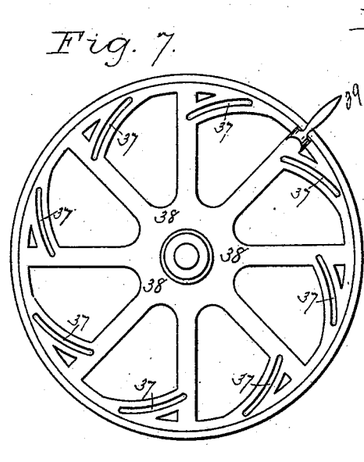
Fig. 7 shows modified devices for spreading the tamping-bars.
Figure 8:
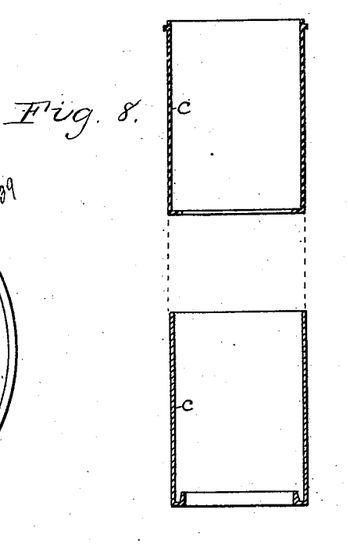
Fig. 8 shows cross-sections of my improved mold.

Another arrangement for spreading the tamping-bars is shown in Fig. 7, and consists simply in extending the upper ends of the tamping-bars up a suitable distance above the gear J through eccentric slots 37, made in a circular frame, 38, which is journaled loosely on the extended sleeve of cam-wheel I just above the gear J, and has an arm, 39, extending radially from the periphery of said frame, which, when the tamping-bar carriage reaches the point near the limit of its upward movement, where the tamping-bars should spread to make the flange of the tile, strikes against a suitable device secured and extending, preferably, from the arm E' of the standard, and is oscillated a short distance. When frame 38 is oscillated, the upper ends of said tamping-bars are forced outward by the slots 37, thus spreading the same, substantially as shown.

Figure 11:
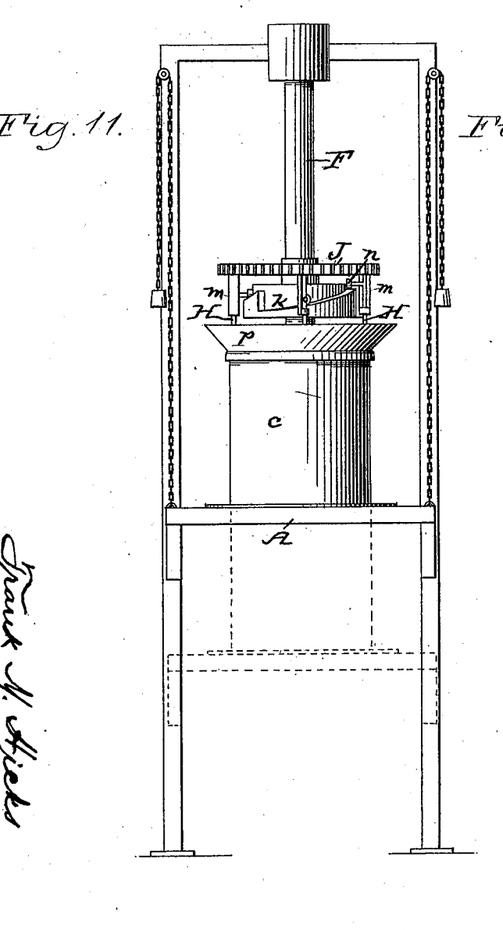
Fig. 11 shows a front elevation of a modified form of my machine.

Fig. 11 is a diagram which shows my improved transversely-revolving vertically-reciprocating tamping-bars in conjunction with a lowering-platform core and mold.

Figures 12, 13:
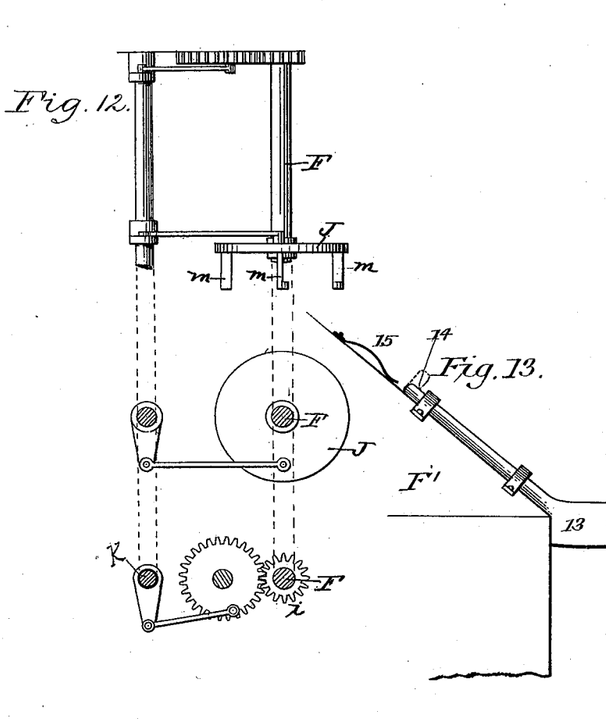
Fig. 12 is a detail view of mechanism for oscillating instead of revolving the tamping-bars around a horizontal center.
Fig. 13 shows modified devices for cutting the shoulder in the flanged ends of tile.

Fig. 12 is a diagram showing my improved mechanism in conjunction with a revolving core and mold, which are placed on a lowering-platform and pushed downward as the tamping-bars build the tile.

Instead of the large gear J having a revolving motion, it may have an oscillation equal in extent to the distance between the tamping-bars. Such a movement would accomplish just the same effect as a transversely-revolving motion. I do not wish to limit myself to any particular construction for this purpose, but have, for sake of better illustration, shown in Fig. 12 how this result can be accomplished. In this figure shaft K is oscillated by means of an arm projecting laterally from its upper end, which, through a pitman, is oscillated by an idle-gear which meshes with gear $i$ of shaft F. It may be necessary sometimes in the construction of large tile to weight the tamping-bar carriage, so that said bars will, when they descend, strike a harder blow and pack the material more solidly.

In addition to the arrangement of parts producing the movements of the core, mold, and tamping-bars in the manner and sequence already described, there are other arrangements which come within the scope of my invention. For instance, the platform being stationary, the tamping-bars and the core may rise simultaneously from the limits of the downward movement of the latter, thus packing the tile material as the core is raised.

In this modification, if the shell be made to revolve, the tamping-bars do not revolve horizontally around a common center. If the shell is stationary the tamping-bars must revolve. The reverse of this action of the mold, core, platform, and tamping-bars can also be accomplished—that is, the mold and platform may be pushed down by the action of the tamping-bars around the core. In this modification, also, if the shell revolves or oscillates, the tamping-bars do not revolve horizontally. On the contrary, if the shell is stationary the tamping-bars revolve. I also wish to refer to the fact that in order to economize space I can make the tamping-bars rise and the platform carrying the mold and core with it descend both at the same time. One thing I desire especially to call attention to is that when the tamping-bars revolve horizontally or oscillate around a common center the shell and core are stationary on their axes, and when the tamping-bars do not revolve or oscillate horizontally it is necessary the core and mold should do so. I can use my tamping-bar mechanism in conjunction with a revolving core and stationary shell, or vice versa. I do not prefer such motion, though.

I desire, in conclusion, to be considered as covering all movements which require horizontally-revolving vertically-vibrating tamping-bars, whether the tamping-bar carriage moves upward as the tile is being built or not, and I also desire to cover any movements of the platform-core and shell used in conjunction with tamping-bars operating after the principle herein set forth.

What I claim is—

1. The combination, with a tile-machine, of the longitudinally-vibrating tamping-bars revolving horizontally around a common center, a vertically-reciprocating central core, and a removable mold surrounding the same between which the tiles are made.

2. In a tile-machine, the combination, with the mold and core, of a series of tamping-bars operating between the mold and core, a revolving cam or lifting plate which imparts longitudinal vibrations to the tamping-bars, and supporting-frames for the tamping-bars, the said tamping-bars, cam or lifting plate, and supporting-frames being connected to move vertically together upon a support extending in the same direction as the axis of the mold, upon which they are free to slide, whereby as the material is fed into the mold the cam-plate and tamping-bars are automatically moved simultaneously to accommodate themselves to such material, substantially as set forth.

3. In a tile-machine, the combination of a series of longitudinally-vibrated tamping-bars, a core and mold having its upper end increased in diameter, supports for the tamping-bars movable in the direction of the axis of the tile being formed, and also free to be moved radially, and spreaders which move the said supports and tamping-bars radially from their common center, substantially as and for the purpose set forth.

4. The combination, with a tile-machine, of the tamping-bars having a longitudinally-vibrating motion and moving around a common center, so that they together form a circle struck from said center, a removable mold, and a vertically-reciprocating core between which the tile is made.

5. In a tile-machine, the combination, with a core and mold, of a series of vibrating tamping-bars and an oscillating former adapted to be brought into contact with the inner surface of the tile being formed to produce a shoulder thereon, mounted upon a rotating support within the tile, substantially as described.

6. In a tile-machine, the combination, with a series of independently-acting tamping-bars placed an equal distance from a common center, a mold and core of a hollow vertical shaft arranged concentric with the said common center of said tamping-bars above and in alignment with the center of said core, and a spiral conveyer therein, said conveyer and shaft revolving independently one from the other, as set forth.

7. In a tile-machine, the combination, with a core and mold, one revolving relatively to the other, of a series of tamping-bars, movable formers carried by the core at its upper end adapted to engage with the interior of the tile to form a shoulder therein, and spreaders connected with the said formers to move them outward into contact with the tile when the tamping-bars have reached the upper end of the mold, substantially as described.

8. In a tile-machine, the series of longitudinally-vibrating tamping-bars, in combination with a mold having its upper end flared outward, a core, and spreading-blocks 16 and miter-blocks 17, as described, attached to the upper end of said core for making a shoulder in the upper end of said tile between said flared end of the mold and said core.

9. In a tile-machine, the combination, with the vertically-reciprocating core, a removable mold, and a platform upon which the same are supported, of a vertical shaft in alignment with the center of said core, and above and independent of the same a circular frame for supporting and directing the movements of the tamping-bars, and said tamping-bars.

10. In a tile-machine, the combination, with a vertically-reciprocating core, a removable mold, and a platform for supporting the same, of a vertical shaft in alignment with and above the center and independent of said core, a series of tamping-bars, and circular frame for supporting and directing the same and revolving around the center of said shaft, said tamping-bars having a longitudinal vibration, as set forth.

11. In a tile-machine, the combination, with a removable mold, a vertically-reciprocating core, and platform for supporting the same, of a vertical shaft above and in alignment with the center, but independent of said core, a series of tamping-bars having lateral arms at or near their upper ends, the cam-wheel I, having one or more cam-surfaces on its periphery and revolving with said shaft, and a circular frame for supporting and directing the vibrations of said tamping-bars.

12. In a tile-machine, the combination, with a mold, core, and platform for supporting the same, of a vertical shaft above and in alignment with the center of said core, a series of tamping-bars having transverse arms near their tops, gear-wheel revolving independently around said shaft having hangers depending from its arms with guides thereon for directing said tamping-bars, and cam-wheel I, fast to said shaft, having several cam-surfaces around its circumference.

13. The combination, with the mold, core, and platform supporting the same, of shaft F, tamping-bars H, having transverse arms near the upper ends with friction-rollers journaled in them, gear J, hangers m, depending from the arms thereof, having guides m' thereon, and cam-wheel I, having several cam-surfaces around its circumference and so mounted on said shaft as to revolve therewith, but having an independent vertical movement, substantially as and for the purpose set forth.

14. In a tile-machine, the combination, with the mold, core, and platform supporting same, of shaft F, cam-wheel I thereon, having cam-surfaces k, tamping-bars H, having lateral arms projecting from them near their upper ends, gear J, revolving around shaft F independently thereof, and inverted-L-shaped hangers m, having suitable guides on their vertical arms for directing the movement of said tamping-bars and secured to the arms of gear J by straps, in combination with spreading-bars 11, as set forth.

15. The combination, with tamping-bars H, gear J, and inverted-L-shaped hangers m, secured to the arms of said gear by straps and expansion-spring 9, of spreading-bars 11, as set forth.

16. The combination, with the tamping-bars having laterally-projecting arms at or near their upper ends, friction-rollers n n on the ends of said arms, hangers m, having guides m' thereon, and frames from which said hangers depend, of the cam-wheel I, having cam-surfaces k around its periphery.

17. The combination, in a tile-machine, with the core, a sleeve, d, arranged centrally and vertically therein, and screw-shaft D, having its upper end stepped to a less diameter, as shown, of shaft F, above and in vertical alignment with the center of said sleeve, whose upper end edges slip around the lower end of the heel of said shaft and are of such shape as to transmit the motion imparted to it by the screw D thereto.

18. In a tile-machine, the combination, with a screw-shaft, D, having its upper portion stepped to a less diameter and provided with a head at its upper extremity, the circumference of which is serrated, of the vertically-reciprocating core having a central boss in its bottom tapped to receive said screw, and a vertical central sleeve having its lower end edges flanged inward and serrated with reference to the serrated head of said screw.

19. In a tile-machine, the combination, with the mold and core having a truncated-cone-shaped top, of the hollow shaft F, having its lower end open and connected to a casting, F', which rests upon the said truncated part of the top of said core when the latter is at the limit of its upward movement and has its sides beveled in alignment with the sides of said core top and converging to a common point.

20. In a tile-machine, the combination, with mold C, of the revolving boss R and radiating arms r r thereof, having their ends bifurcated and embracing said mold, substantially as and for the purpose set forth.

21. In a tile-machine, the combination, with a mold, of the cam s, the sleeve Q, collar R, and arms r, having their ends bifurcated.

22. In a tile-machine, the combination, with a mold, of the cam s, the sleeve Q, collar R, and arms r, having their ends bifurcated, said cam having a series of cogs on its major radius, which, after said cam has raised said sleeve a distance corresponding to the difference between the major and minor radius of said cam, are adapted to engage a series of cogs, q, on the lower edge of said sleeve and revolve it a distance corresponding to that between said arms.

FRANK M. HICKS.

Witnesses:
PORTER B. COOLIDGE,
MINNIE E. COYNE.